(12) United States Patent
Prescott

(10) Patent No.: US 9,578,819 B2
(45) Date of Patent: Feb. 28, 2017

(54) PRESSURIZED GROWING AIR SYSTEM FOR VERTICAL AND HORIZONTAL PLANTING SYSTEMS

(71) Applicant: Mark R Prescott, Stephentown, NY (US)

(72) Inventor: Mark R Prescott, Stephentown, NY (US)

(*) Notice: Subject to any disclaimer, the term of this patent is extended or adjusted under 35 U.S.C. 154(b) by 0 days.

(21) Appl. No.: 14/163,660

(22) Filed: Jan. 24, 2014

(65) Prior Publication Data

US 2016/0192604 A1    Jul. 7, 2016

Related U.S. Application Data

(60) Provisional application No. 61/849,339, filed on Jan. 24, 2013.

(51) Int. Cl.
*A01G 25/00* (2006.01)
*A01G 9/02* (2006.01)
*A01G 27/06* (2006.01)

(52) U.S. Cl.
CPC ............ *A01G 27/06* (2013.01); *A01G 9/025* (2013.01); *Y02P 60/244* (2015.11)

(58) Field of Classification Search
USPC .......... 47/81, 83, 79, 82, 65, 65.6, 63, 59 R, 47/62 R, 62 A; 239/145, 590, 590.3
See application file for complete search history.

(56) References Cited

U.S. PATENT DOCUMENTS

| | | | | |
|---|---|---|---|---|
| 3,714,392 A * | 1/1973 | Katzman et al. | ......... | F24H 1/00 128/203.17 |
| 4,295,296 A * | 10/1981 | Kinghorn | ............... | A01G 9/025 47/82 |
| 4,380,136 A * | 4/1983 | Karpisek | ................ | A01G 9/023 47/39 |
| 5,367,823 A * | 11/1994 | Ferris | ...................... | A47G 7/041 47/39 |
| 5,382,410 A * | 1/1995 | Peltier | ...................... | A61L 9/127 239/34 |
| 5,916,493 A * | 6/1999 | Miller | ............... | A61M 16/1075 128/204.13 |
| 6,499,249 B1 * | 12/2002 | Luijkx | .................. | A47F 7/0078 206/423 |
| 7,499,632 B2 * | 3/2009 | Granger | .............. | A01M 1/2033 392/386 |

(Continued)

FOREIGN PATENT DOCUMENTS

WO    WO 2012/129522    * 9/2012    ............... A01G 9/02

*Primary Examiner* — Andrea Valenti
(74) *Attorney, Agent, or Firm* — Schmeiser, Olsen & Watts, LLP

(57) ABSTRACT

A Growing apparatus for cleansing air and watering plant, wherein the apparatus includes a modular panel constructed for either vertical or horizontal planting systems, including connecting couplers and end caps for directing water flow from upper to lower channels. Panel consist of 5 channels per section with opposing conical top and bottom set at 45 degree angles (FIG. 9-23) for both channeling water and accepting irrigation nozzle. System can also use a horizontal channel system while the orientation is different but function is the same. Panels stack nesting consecutively on top of each other to make larger systems.

15 Claims, 9 Drawing Sheets

(56) References Cited

U.S. PATENT DOCUMENTS

| | | | |
|---|---|---|---|
| 7,775,459 B2* | 8/2010 | Martens, III | B05B 17/0684 |
| | | | 128/200.14 |
| 8,505,238 B2* | 8/2013 | Luebbers | A01G 31/02 |
| | | | 47/62 A |
| 8,683,744 B2* | 4/2014 | Chang | A01G 9/027 |
| | | | 47/41.01 |
| 8,833,366 B2* | 9/2014 | Colombo | A01M 1/2033 |
| | | | 128/200.14 |
| 9,222,719 B2* | 12/2015 | Bortoletto | F25D 17/042 |
| 2009/0223126 A1* | 9/2009 | Garner | E04F 13/081 |
| | | | 47/66.7 |
| 2010/0146855 A1* | 6/2010 | Ma | A01G 9/025 |
| | | | 47/82 |
| 2012/0227320 A1* | 9/2012 | Dos Santos | A01G 9/025 |
| | | | 47/79 |
| 2012/0279120 A1* | 11/2012 | Prescott | A01G 27/003 |
| | | | 47/48.5 |
| 2013/0152467 A1* | 6/2013 | Chang | A01G 9/025 |
| | | | 47/82 |
| 2014/0115963 A1* | 5/2014 | Sung | A01G 9/025 |
| | | | 47/82 |
| 2015/0096229 A1* | 4/2015 | Chang | A01G 27/005 |
| | | | 47/82 |
| 2015/0230412 A1* | 8/2015 | Ito | A01G 27/005 |
| | | | 47/66.7 |
| 2016/0113211 A1* | 4/2016 | MacKenzie | A01G 9/025 |
| | | | 47/79 |

\* cited by examiner

PRESSURIZED GROWING AIR SYSTEM FOR VERTICAL AND HORIZONTAL PLANTING SYSTEMS

CROSS REFERENCE

This application claims priority of which are incorporated herein by reference (1) provisional application No. 61/849,339.

BACKGROUND

Indoor green walls using plants have been increasingly popular for aesthetics, improved air quality, humidity and natural cooling. Planting system both horizontal and vertical systems have been developed for air cleaning using the microbes living around plant roots for air cleaning. These green structures can pose a number of problems for the owner, mold, algae, and health issues from dirty catch basin reservoir. Drip irrigation or "eb flow systems are the most common methods of irrigation for vertical systems. Because each plant tray drains into the next consecutive tray all the dirt/debris flows into catch basin that is open and exposed to the indoor environment. Poor air circulation creates mold and algae problems, and poor growing conditions for the plants. The plants ability to clean the air is inhibited by these issues and dramatically reduces the potential healthy effects green walls can have. Aeroponic systems like U.S. Pat. No. 850,523B2 Luebbers, Hensley, use spray methods for watering plants still resulting in a mixture of soil and debris in irrigation water which will frequently need to be cleaned. Drip vertical systems like patent #EP1416229A2 Darlington, use an air permeable sub-straight creating a similar problem of organic/dirt debris building up in containment reservoir. EP2654400A 1 Paleszezak discloses a series of pipes, with alternating prismatic shaped bins, for air circulation. WO2011 019277 A2 Kluiver discloses a system where indoor pollution is captured on the leaves of a plant and washed into substrate. System WO201 0033423A 1 Wolverton/Middlemark, use beds with various sized substrate to and drip irrigation to process indoor air through. U.S. Pat. No. 6,477,80582 Ware uses similar drip methods, again mixing irrigation water directly with planting mediums and debris. Therefore it is the purpose of this invention to demonstrate an irrigation system that efficiently delivers water and air directly into planting substrate that does not need modification for air flow, while keeping irrigation water separate from living area. It is the purpose of this invention to use air movement to facilitate water movement over a modified wicking system into the soil, not using the capillary nature of the wick to do so as U.S. Pat. No. 4,741,125 Donald Pengorest where a bi expandable metal control device is used for control. Further U.S. Pat. No. 4,219,967 Hickerson, relies on a wick system as well. Capillary wicks are used in many growing devices however controlling the moister they deliver is not easily achieved, leaving soil saturated and unhealthy. There for it is the purpose of this invention to control air and moisture delivery through a specifically designed nozzle that removes the need for electronic equipment for regulating moisture levels.

SUMMARY

The System Pressurized vertical-horizontal growing system solves a number of problems that convention irrigation systems have as well as growing systems for the purpose of Phytoremediation. Including the elimination of water catch basins, electronically monitoring equipment, or the need for specially modified planting mediums. This system while using a capillary wick does not require capillary "action" from the wick for moisture movement, but relies on air movement to create a "negative" air pressure for drawing water into the soil substrate. This process created by the air channel location within the wick is self regulating. Whereas the more air flow moving through the system the more water movement thus creating a balance with the water to air ratio insuring healthy roots and plants without relying on electronic equipment. It is also a benefit of the process to create a microclimate and moisture rich area around the plant grown, this is accomplished by the movement of air "pushing" through the soil. In addition our air flow rates are more favorable to total filtration per pass of air due to slower rates. In addition air filtration can be targeted to specific areas where air remediation is needed.

BRIEF DESCRIPTION OF DRAWINGS

FIG. 8 Shows a cross section of air channel (9) with planting pot (12) pot his hanging on rail (19) and seated into nozzle (1) wick (4) is hanging in irrigation water (11) with the two inch space (18) between the bottom of nozzle (1) and irrigation water (11) Air and moisture from channel (9) move into the soil with microbes (14) Clean remediated air leave planting pot (12) from top of pot bathing plant in humid air (16).

DETAILED DESCRIPTION

Water/air delivery system for vertical and horizontal plantings that enables water, air and heat (if needed) delivery through a single pressurized system in conjunction with a targeted delivery nozzle designed to efficiently combine air and water in tandem while keeping soil substrate adequately moist for plant and microbe growth. This system enables High air volumes to be pumped through root zones enhancing the process of Phytoremediation. System is scalable for small consumer growing system and to large commercial applications. This system eliminates the need for separate water drainage/reservoir catch basins, electronic sensing or timers for watering. This system also conserves energy with targeted nozzles that deliver water, air and optional heat to each growth container. Nozzles can be removed from the system when not in use so no energy or water will be used. Nozzle uses absorptive wick but does not rely on capillary action for moving moisture, rather uses air flow targeted directly behind wick end to propel moisture into growing container soil medium from a "negative" pressure created within the nozzle. Thus the purpose of this system is to adequately provide air and water to a U.S. provisional patent 61/849,339 plants roots for air cleaning while keeping water for irrigating the system isolated from rooms interior.

Figure 9:
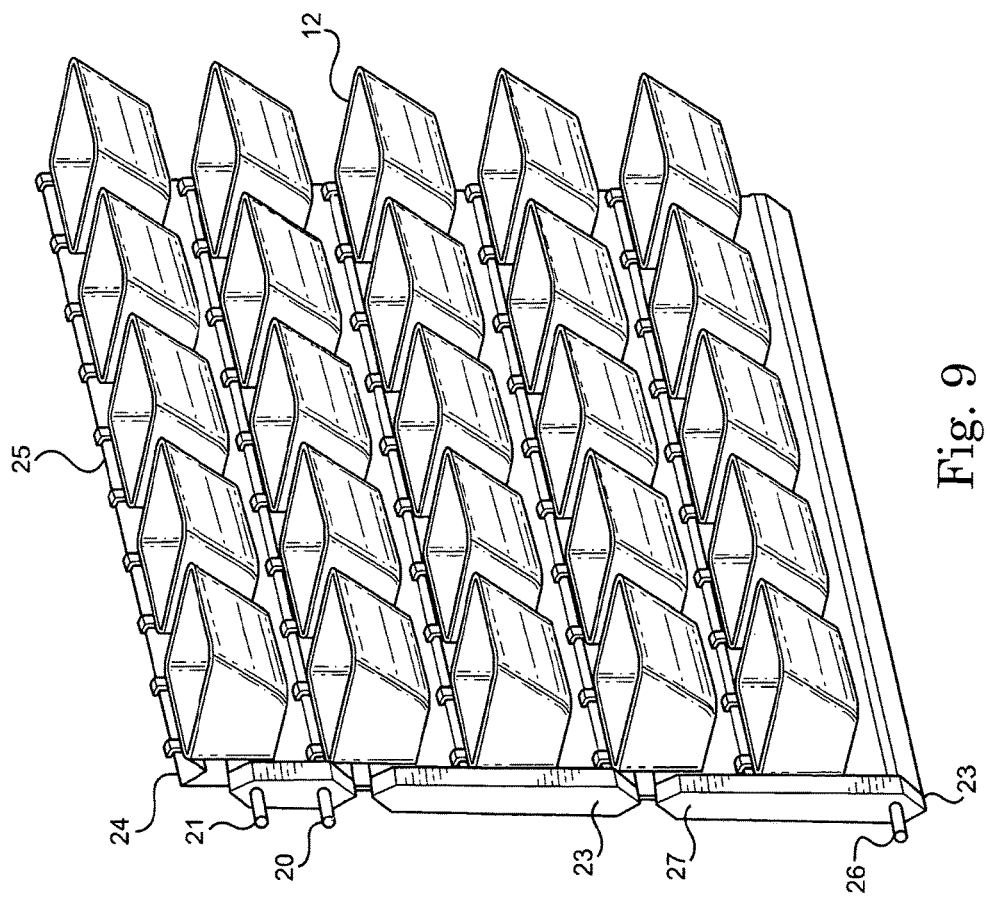
FIG. 9 depicts the embodiment of FIG. 8 having connected chambers that contain indoor air and a small reservoir of water.

This system embodies connected chambers (FIG. 9) that contain indoor air and a small reservoir of water 17, 11 that can either be fed continuously or intermittently with a pump or direct water feed using a solenoid and a timer. Nozzle 1 placement in the system is critical and needs to be set into the system so water does not mix with the nozzle 1 system. Only air enters the nozzle 1 which in turn creates a negative pressure via the recessed air channel which draws the water into the substrate.

Figure 1:
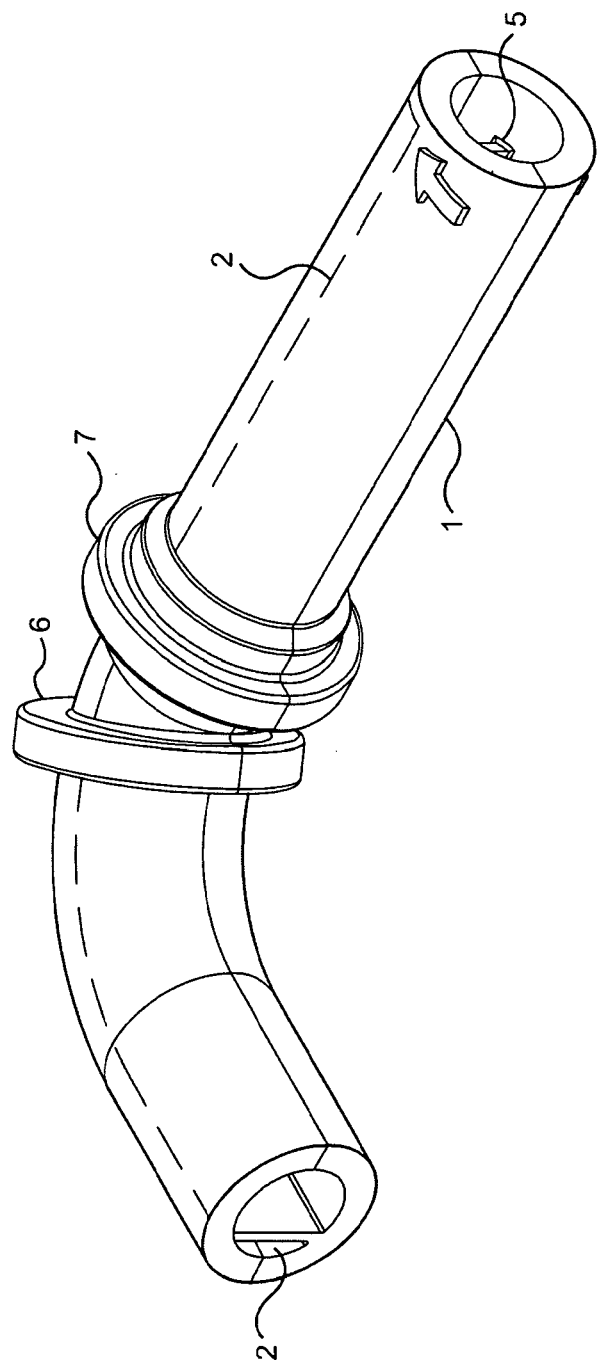
FIG. 1 Shows nozzle for vertical system (1) and nozzle with collar (6) for positioning nozzle in the correct depth. (2) shows air channel for moving air through (1) nozzle. Pot collar (7) holds pot the proper distance from channel. Recessed air channel (5) ends ⅛-¼ inch from nozzle opening to insure negative pressure build up in nozzle (1,2).
Figure 2:
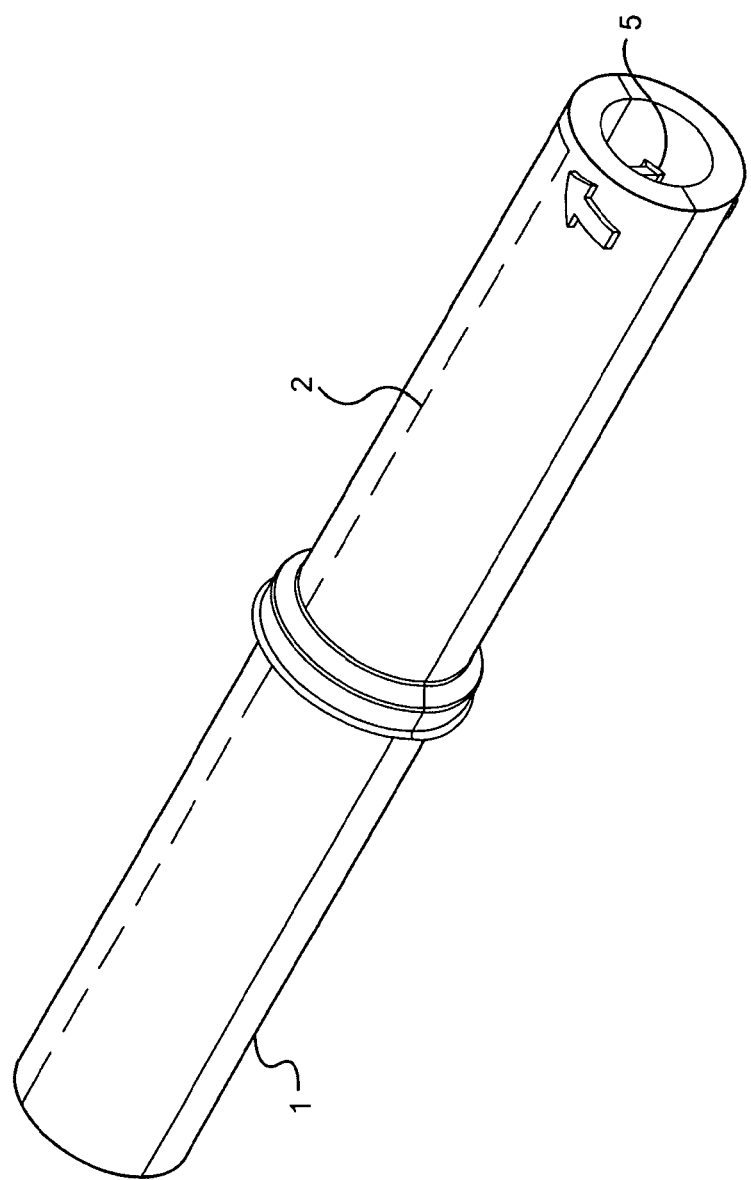
FIG. 2 Shows a straight nozzle (1) for horizontal growing channels with air channel (2) and (5) recessed air chamber.
Figure 3:
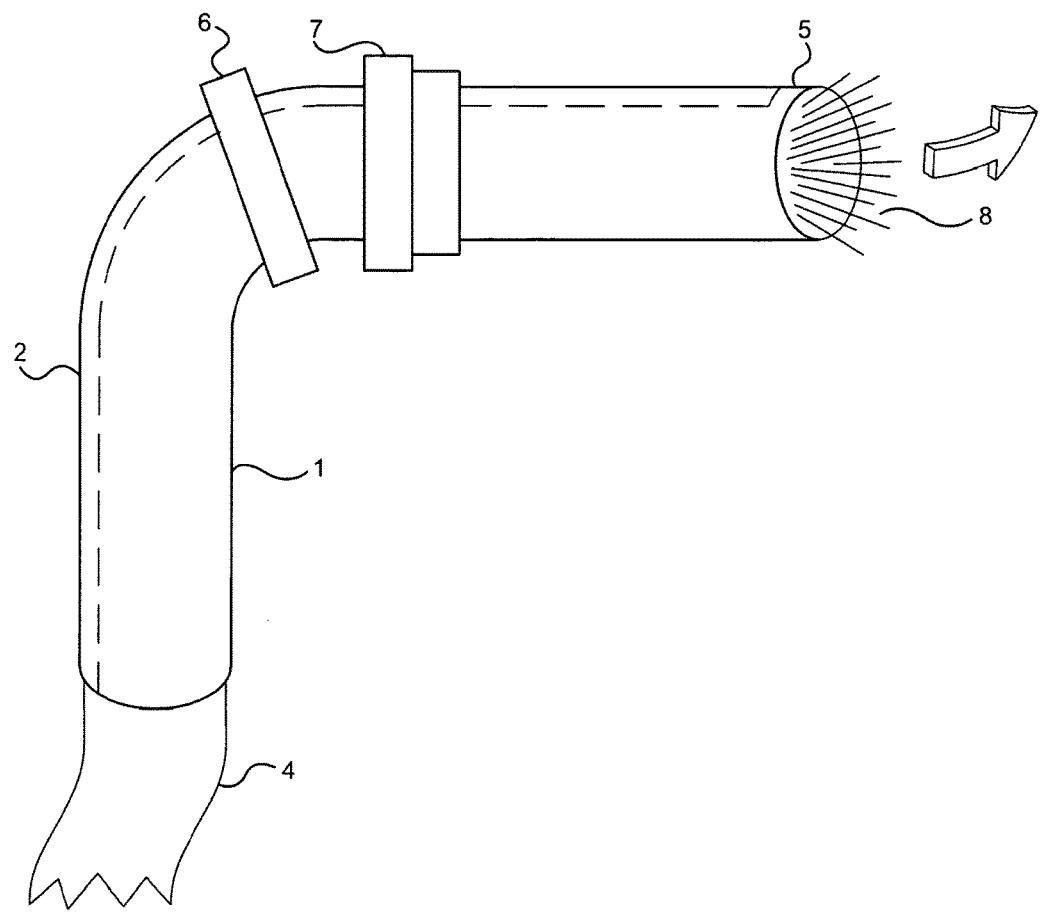
FIG. 3 Demonstrates the nozzle (1) with fiberglass wick (4) inserted and (8) air flow out of tube from channel.
Figure 4:
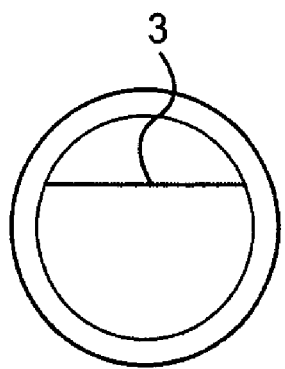
FIG. 4 Is a front look at nozzle (1) tube end (2) shows the air channel and nozzle end without the fiberglass wick.
Figure 5:
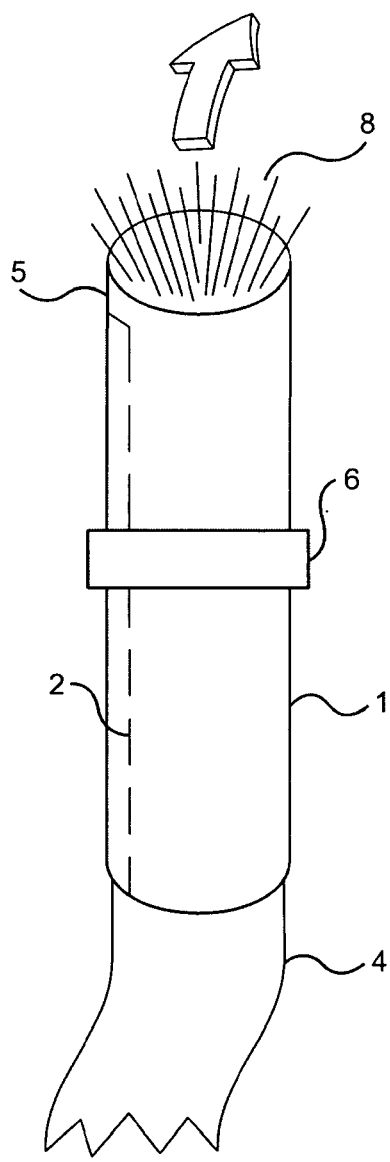
FIG. 5 Demonstrates a straight nozzle (1) for horizontal applications with which (4) nozzle stop (6) and air flow out of nozzle (8).
Figure 6:
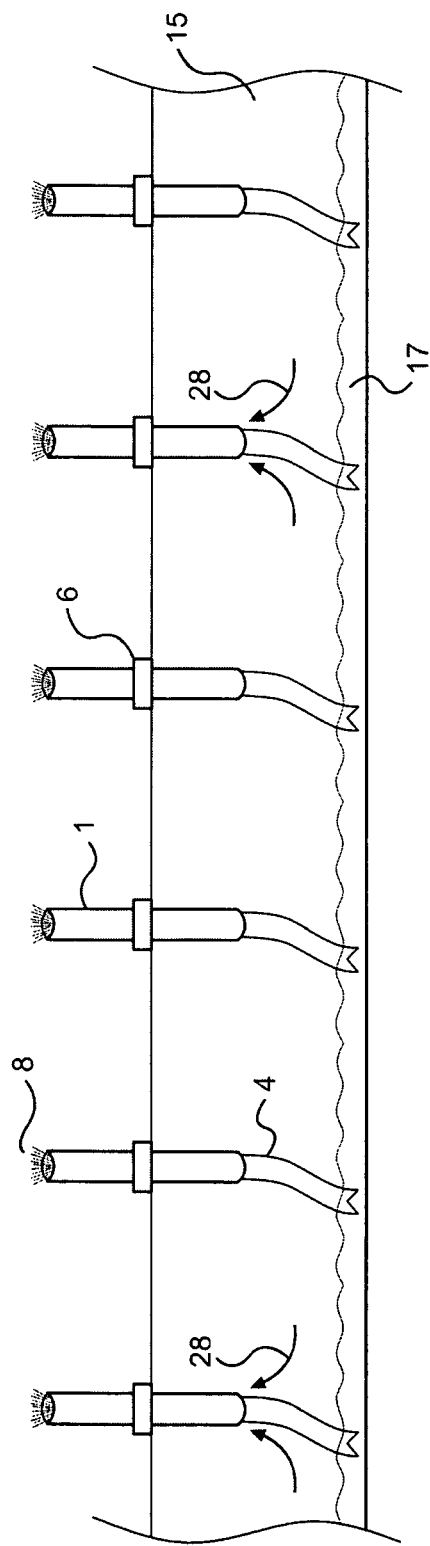
FIG. 6 Is a side view of horizontal panel (15) showing nozzles (1) seated into channel with which (4) hanging in irrigation water (17) irrigation water needs to be 2 inches from base of nozzle (1, 18) for process to work properly.
Figure 7:
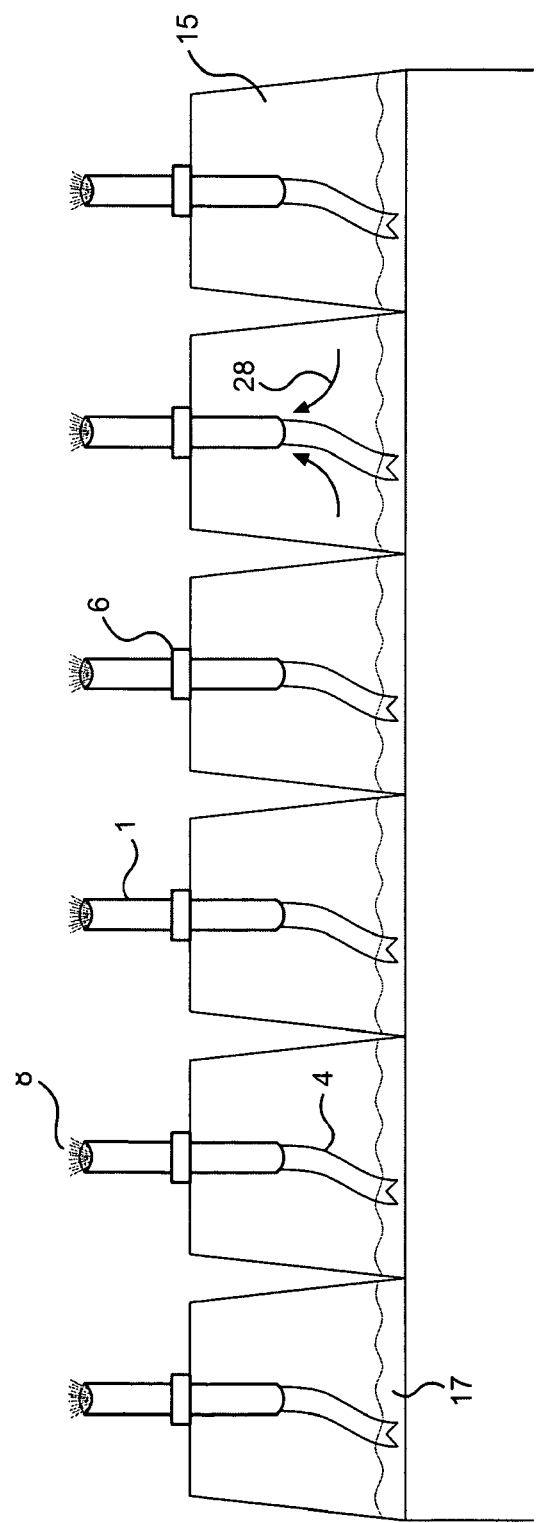
FIG. 7 is a front cut away look at a horizontal channel (15) showing irrigation water (17) and distance between irrigation water and nozzle base (18).
Figure 8:
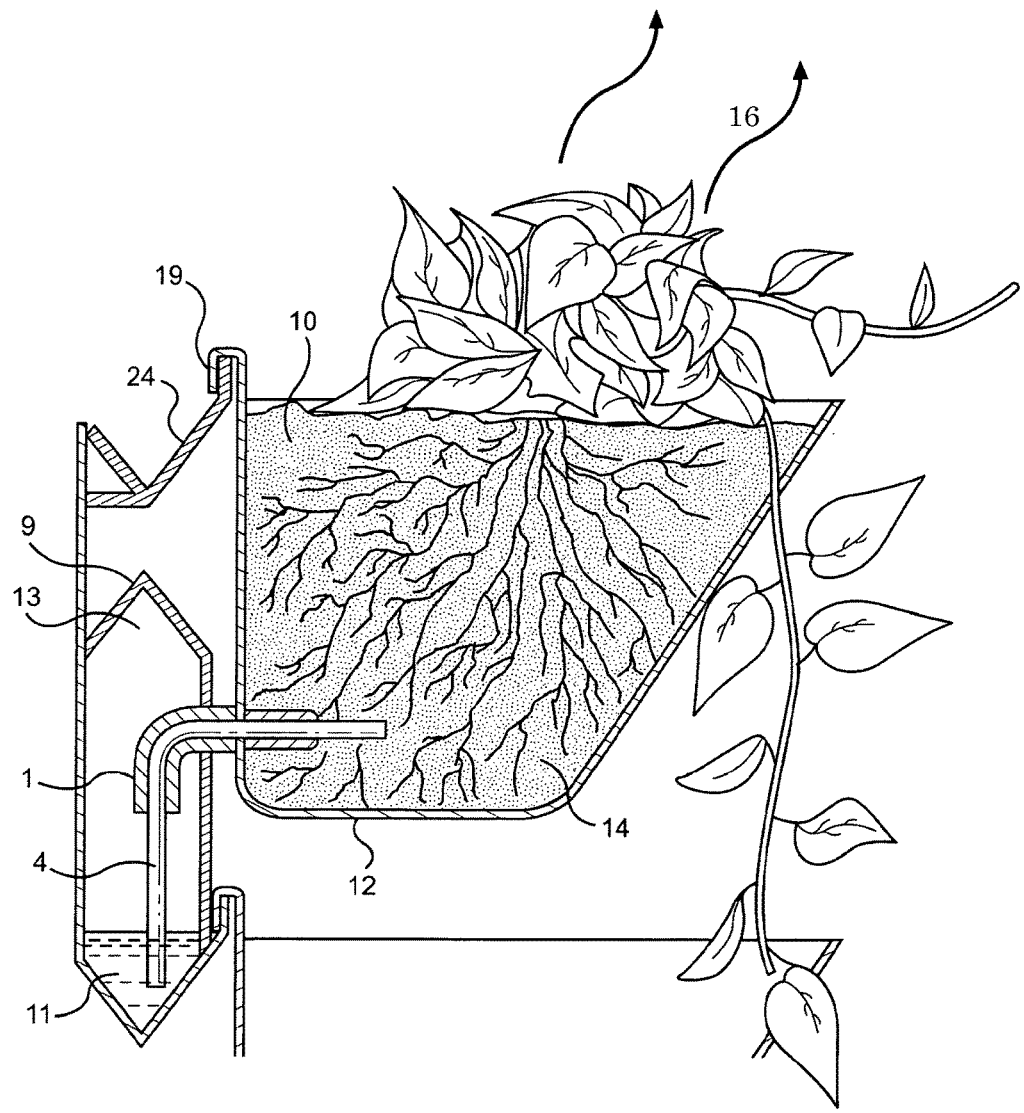
FIG. 8 (9, 13) to see channel. (5) shows recess in air chamber to create the negative pressure on the wick for water movement.

The Growing apparatus may be for cleansing air and watering plant, wherein the apparatus includes a modular panel constructed for either vertical or horizontal planting systems, including connecting couplers 19 and end caps 20 for directing water flow from upper to lower channels 22. The panel consist of five (5) channels per section with opposing conical top and bottom set at 45 degree angles 23 for both channeling water and accepting irrigation nozzle. Note, the system can also use a horizontal channel system as FIGS. 7 and 8 demonstrate, while the orientation is different, the function is the same. Panels 24 stack nesting consecutively on top of each other to make larger systems. Panels may have an attached rail 25 for accepting and hanging planting container.

The panels may have ports for accepting "air" 21 and "water" 20 from an external fan or blower as well as a drain 26 located at the bottom of the last run for draining the system. End connecting caps that extend upwards into bottom of channel 27 restricting and holding water in the base of the channel as well as the channel within the end cap for directing water flow to the bottom of next consecutive channel.

Air ports 21 at the top of the air chambers 2 may be for the purpose of air direction forced in a downward flow to alleviate water and air "mixing" within the nozzle. The system may create separation of irrigation water in channel 11 from soil substrate 10 by positive pressure within said channel 13 insuring no mixing of the irrigation water 11 and planting medium 10 occurs.

The system may use a wicking system/nozzle 1 spaced from a distance of 2-3 inches from the water source 11 to the base of the nozzle holding wick in center of channel to insure no mixing of water and air occur. The nozzle may use a separate air chamber 2 for efficiently moving air out of said chamber 28 without extreme pressure build up. The system may utilize said nozzle and air chamber 2 that is recessed back ⅛-¼ inch to direct air volume over end of exposed wick to facilitate water movement into soil rooting media Wherein without directed air movement over said wick moisture movement would not occur. The system may use air movement through said air chamber 2 into said nozzle as a means for irrigating a plant.

What is claimed is:

1. A growing apparatus for cleansing air and watering plant comprising:
    a modular panel having a rail, a plurality of channels, an air port and a water port, wherein each channel of the plurality of channels has an opposing conical top and bottom to channel water and accept a nozzle having a wick;
    a connecting coupler and end cap configured to direct water flow from a first channel to a second channel wherein the end cap restricts and holds water within a base of the first channel and directs water flow to a bottom of the second channel; and
    an fan connected to the air port, wherein the fan provides an air flow behind the wick and a negative pressure of the air flow within the nozzle propels the water flow through the wick.

2. The apparatus of claim 1, wherein the nozzle is spaced a distance of 2-3 inches above a source of the water and the wick is centered in each channel of the plurality of channels to ensure no mixing of the source of water and air occur.

3. The apparatus of claim 1 wherein the nozzle has a separate air chamber to move air out of said air chamber without a pressure build up.

4. The apparatus of claim 3, wherein the movement of air through the air chamber into the nozzle irrigates a plant.

5. The apparatus of claim 1, wherein the nozzle directs a volume of air over an end of the wick to facilitate water movement into a soil rooting media.

6. The apparatus of claim 1, wherein the air port forces air flow in a downward direction to alleviate a mix of water and air within the nozzle.

7. The apparatus of claim 1, wherein positive pressure within the plurality of channels creates separation of water in the first channel and the second channel from a soil substrate within the plurality of channels ensuring no mixing of the water and soil substrate.

8. The apparatus of claim 1, wherein each section of the modular panel consists of five channels per section.

9. The apparatus of claim 1, wherein orientation of the plurality of channels is horizontal.

10. The apparatus of claim 1, comprising more than one modular panel stacked vertically.

11. A system for cleansing air and watering a plant comprising:
    a modular panel having a rail, a plurality of channels, a fan connected to an air port, a water port connected to a water feed, wherein each channel of the plurality of channels has an opposing conical top and bottom; and
    a planting pot hung from the rail, the planting pot seated on a nozzle having a separate air chamber and a wick, wherein the fan connected to the air port provides an air flow behind the wick, wherein the air flow creates negative pressure within the nozzle and propels water from the water feed through the nozzle into the planting pot.

12. The system of claim 11, further comprising a pump directing the water feed into the water port and air entering the air port flows downward, preventing air and water from mixing in the nozzle.

13. The system of claim 11, further comprising interconnecting couplers and end caps configured to direct a flow of water from an upper channel to a lower channel.

14. The system of claim 13, wherein the lower channel includes a draining system.

15. The system of claim 13, wherein the nozzle is spaced 2-3 inches above a source of water and a base of the nozzle holding the wick is centered in the lower channel to prevent mixing of air and the source of water occurs.

* * * * *

UNITED STATES PATENT AND TRADEMARK OFFICE
CERTIFICATE OF CORRECTION

PATENT NO.         : 9,578,819 B2                                   Page 1 of 2
APPLICATION NO.    : 14/163660
DATED              : February 28, 2017
INVENTOR(S)        : Mark Randall Prescott It is certified that error appears in the above-identified patent and that said Letters Patent is hereby corrected as shown below:

On the Title Page

Abstract (Line 5), please change "consist" to -- consists --

In the Specification

At Column 1, Line 33, please change "sub-straight" to -- substrate --

At Column 1, Line 35, please change "Paleszezak" to -- Paleszezak, --

At Column 1, Line 37, please change "Kluiver" to -- Kluiver, --

At Column 1, Line 42, please change "Ware" to -- Ware, --

At Column 1, Line 53, please change "Pengorest" to -- Pengorest, --

At Column 2, Line 26, please change "(1,2)." to -- (1, 2). --

At Column 2, Line 34, please change "(2)" to -- (3) --

At Column 2, Line 42, please change "(1, 18)" to -- (1, 28) --

At Column 2, Line 43, please change "is" to -- Is --

At Column 2, Line 45, please change "(18)" to -- (28) --

At Column 2, Line 47, please change "his" to -- is --

At Column 2, Line 49, please change "(18)" to -- (28) --

Signed and Sealed this
Seventh Day of November, 2017

Joseph Matal
*Performing the Functions and Duties of the
Under Secretary of Commerce for Intellectual Property and
Director of the United States Patent and Trademark Office*

CERTIFICATE OF CORRECTION (continued)
U.S. Pat. No. 9,578,819 B2

At Column 3, Line 1, please change "system" to -- systems --

At Column 3, Line 31, please change "consist" to -- consists --

At Column 3, Line 63, please change "media" to -- media. --

In the Claims

At Column 4, Line 14 (Claim 1, Line 13), please change "an fan" to -- a fan --

At Column 4, Line 22 (Claim 3, Line 1), please change "claim 1" to -- claim 1, --